Dec. 31, 1940.   E. MAY   2,227,269
FIRE PROTECTION DEVICE FOR MOTION PICTURE PROJECTORS
Filed June 3, 1939   2 Sheets-Sheet 1
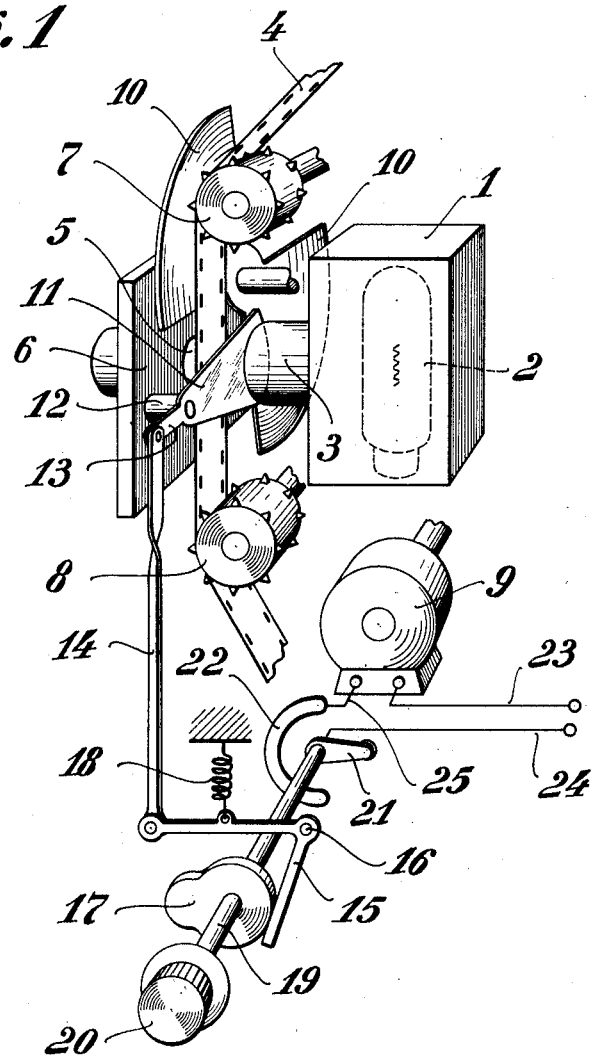
INVENTOR
Erwin May
BY
ATTORNEY

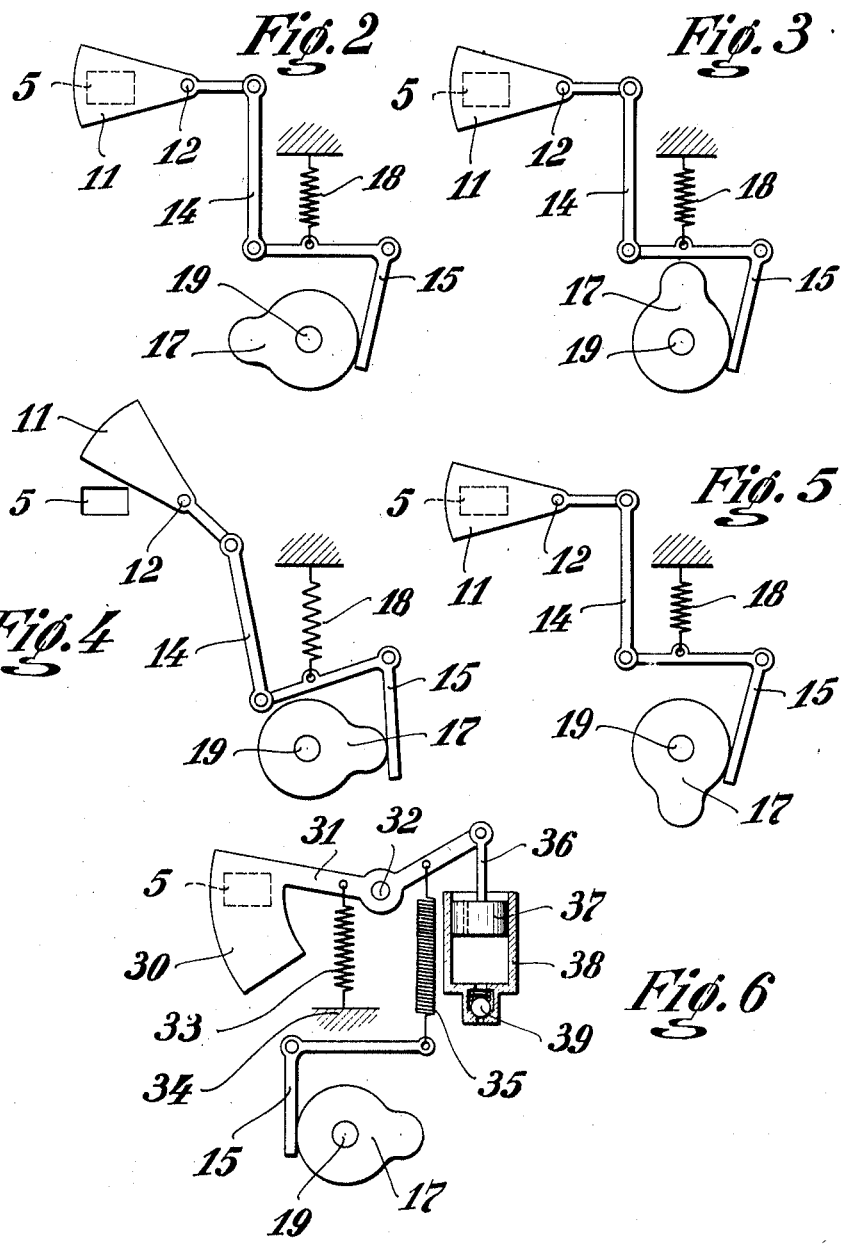

Patented Dec. 31, 1940

2,227,269

UNITED STATES PATENT OFFICE 2,227,269

FIRE PROTECTION DEVICE FOR MOTION PICTURE PROJECTORS

Erwin May, Wetzlar, Germany, assignor, by mesne assignments, to Frank Dumur, Lausanne, Switzerland Application June 3, 1939, Serial No. 277,199
In Germany June 10, 1938

2 Claims. (Cl. 88—17)

This invention relates to fire protecting devices to be used with motion picture projection apparatus to protect the film against fire which may be caused by the heat from the projection lamp. The device may be called a fire shutter which is moved in between the film and the projection lamp while the film is standing still and during the starting moments of the film. Such fire shutter is therefore not to be confused with the usual shutter which closes the film window while the film is shifted between the projection of the individual pictures.

It has been proposed to operate such fire shutters by means controlled by or from the lamp circuit; or by means of a speed regulator. It has been proposed to operate the fire shutter by means actuated from the film itself. However, all such prior devices are rather complicated and expensive without giving assurance of complete safety. If such devices are actuated and controlled by the film itself there is an additional disadvantageous mechanical load on the film.

The object of this invention is to provide a fire protecting device for motion picture projectors characterized by extreme simplicity in construction and operation together with complete safety. A particular feature of the invention is that the film window of the projector is not uncovered until after the film has started to run. In operation, the film motor circuit is closed to start the motor to run the film and when the latter has attained operating speed, the fire shutter is opened. The invention is illustrated in the accompanying drawings in which—

Fig. 1 is a perspective view of a motion picture projection apparatus equipped with a fire protecting device according to this invention. The illustration is diagrammatic in character with parts removed and parts broken away.

Figs. 2 to 5 are diagrams illustrating the operation of the device. Fig. 2 shows the fire shutter in the same position as in Fig. 1 when the film is standing still. Fig. 3 shows the parts in position after the motor has been started. Fig. 4 shows the fire shutter open and the film window exposed. Fig. 5 shows the fire shutter closed at the end of the cycle of operations.

Fig. 6 illustrates a modification.

Referring to Fig. 1 there is shown a projection apparatus comprising in general a lamp housing 1 with a projection lamp 2 and condensing lens 3. The film 4 is operated between the lens 3 and the film window 5 in a suitable support 6. The film passes over film transport rollers 7 and 8, the latter being driven by gearing, as usual and not shown, from the motor 9. The usual film shutter is shown at 10.

A fire shutter in the form of a blade 11 is pivoted on a shaft 12 so as to swing in a plane parallel to the plane of the film behind the film and in front of the lens 3. The fire shutter has an arm 13 which by a link 14 is connected to a bell crank 15 suitably pivoted at 16, the support for such pivot not being shown. The bell crank is held in operative engagement with a cam 17 by means of a spring 18. The cam is carried by a suitably supported shaft 19 operated by a knob 20. The shaft carries an arm 21 operable over a conducting sector 22. The one electric supply wire 23 is connected to the motor. The other supply wire 24 is connected to the arm 21. 25 is a wire connecting the sector 22 to the motor, all parts being properly protected by insulation, not shown.

Fig. 1 shows the parts in their respective positions when the apparatus is not working. It will be noted that the motor circuit is open and the fire shutter is in protecting position in front of the lens 3. Thus there is no danger of overheating or burning the film.

If projection is to be carried on the operator turns the knob 20 to rotate the shaft 90° whereby to close the motor circuit between arm 21 and sector 22. The motor starts to run and drive the film. Fig. 2 illustrates the parts in the same positions as in Fig. 1. Fig. 3 shows the parts in position after the motor has started. It will be noted that the cam 17 has not yet caused operation of the bell crank 15 so the fire shutter has not been operated.

A further rotation of the knob 20, shaft 19 and arm 21 leaves the motor circuit closed but moves the cam 17 into the position shown in Fig. 3 where the fire shutter has been operated and projection is made through the film window 5. At this time the film has attained full operative speed. When the projection is to be stopped the knob 20 is moved another 90° in clockwise direction. This movement brings the cam 17 into the position shown in Fig. 5 where the fire shutter is again closed. A fourth turn of 90° of the knob 20 opens the motor circuit, the motor and the film stop and the parts are back into the positions shown in Figs. 1 and 2.

Fig. 6 shows a modification in which the shutter blade 30 is carried by an oscillating lever 31 pivoted at 32. Two springs are attached to the lever. The one spring 33 is a weaker spring and is secured at 34. The other spring 35 is a stronger spring and is attached to the lever 31 and to the bell crank 15. The free end of the lever 31 is pivoted to a piston rod 36 of a piston 37 which moves in a cylinder 38 filled with a suitable liquid. 39 is a valve.

In operation, when the shaft 19 has been rotated 180° as described above and the motor has started, the cam 17 engages the bell crank 15 and swings it clockwise whereby the spring 35 is tensioned. This spring then pulls down on the lever 31 to open the fire shutter 30. This is a slow movement because the spring has to overcome the resistance caused by the liquid in the damping cylinder 38 below the piston 37. This movement also tensions the spring 33. When the motor is cut out the spring 33 pulls on the lever 31 on the left side of the pivot 32 and closes the fire shutter, restoring the parts to their starting position. When the fire shutter is closed, the liquid passes in through the valve 39.

It will be seen from the foregoing that this invention provides a device in which the fire shutter is normally closed when the projection apparatus is not working. When the motor circuit is closed to start the film, the fire shutter remains closed until the film has reached operating speed. Then the fire shutter is opened and projection begins. In practise it will be found that by slowly turning the shaft 19 the film will attain full operating speed before the fire shutter is opened and a step by step operation will not always be necessary.

I claim:

1. A fire preventing device for motion picture projectors which include a projector lamp, film operating means and an electric motor to drive the latter, said device comprising a movable fire shutter positioned in normal closed position to protect the film against heat from said lamp, a manually operated shaft, means operatively connecting said fire shutter and said shaft, a cam on the latter for controlling the operation of said connecting means, an arm on the shaft for controlling the electric circuit to said motor, said circuit controlling arm being positioned with relation to said cam whereby to close said circuit to start the motor in advance of the opening of said fire shutter and means for operating said shaft.

2. A fire preventing device for motion picture projectors which include a projector lamp, film operating means and an electric motor to drive the latter, said device comprising a fire shutter, means for pivoting said shutter to move between the film and said projector lamp from a normally closed position to protect the film into an open position when the film is to be projected, a manually operated shaft, a cam on said shaft, connections to open said fire shutter extending from the same, a spring holding said connections in operative engagement with said cam, means on said shaft for controlling the electric circuit to said motor, said circuit controlling means and said cam being positioned on said shaft in spaced circumferential relation whereby when said shaft is operated the said circuit is closed before said shutter is opened and said shutter is closed before the said circuit is opened.

ERWIN MAY.